United States Patent
Muraki

(10) Patent No.: US 8,154,768 B2
(45) Date of Patent: Apr. 10, 2012

(54) DISPLAY DEVICE AND ELECTRICAL APPARATUS HAVING SUCH DISPLAY DEVICE

(75) Inventor: Motohito Muraki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 829 days.

(21) Appl. No.: 12/203,869

(22) Filed: Sep. 3, 2008

(65) Prior Publication Data
US 2009/0168112 A1 Jul. 2, 2009

(30) Foreign Application Priority Data
Dec. 27, 2007 (JP) .................. 2007-336216

(51) Int. Cl.
*H04N 1/21* (2006.01)
*G06F 1/16* (2006.01)
(52) U.S. Cl. ............... 358/296; 361/679.06; 361/679.29
(58) Field of Classification Search .................. 358/296, 358/442, 444, 115, 1.13; 345/30, 87, 905, 345/156, 184, 169; 361/679.01, 679.06, 361/679.07, 679.21, 679.27, 679.29; 248/660, 248/917
See application file for complete search history.

(56) References Cited

U.S. PATENT DOCUMENTS

| | | | | |
|---|---|---|---|---|
| 4,113,377 A * | 9/1978 | Sone et al. | ...................... | 355/45 |
| 5,308,174 A * | 5/1994 | Kuki | .............................. | 400/83 |
| 5,345,362 A * | 9/1994 | Winkler | .................. | 361/679.06 |
| 5,850,215 A | 12/1998 | Kamiya et al. | | |
| 5,867,148 A * | 2/1999 | Kamimaki et al. | ........... | 345/169 |
| 5,894,326 A * | 4/1999 | McIntyre et al. | ........ | 348/333.06 |
| 6,125,030 A * | 9/2000 | Mola et al. | ............... | 361/679.56 |
| 6,144,549 A * | 11/2000 | Moss et al. | ............... | 361/679.22 |
| 6,266,236 B1 * | 7/2001 | Ku et al. | ................. | 361/679.27 |
| 6,288,891 B1 * | 9/2001 | Hasegawa et al. | ....... | 361/679.07 |
| 6,359,270 B1 * | 3/2002 | Bridson | ........................ | 219/679 |
| 6,384,811 B1 * | 5/2002 | Kung et al. | ................... | 345/168 |
| 6,411,271 B1 * | 6/2002 | Bang et al. | ...................... | 345/87 |
| 6,437,849 B1 * | 8/2002 | DeClerck et al. | ............... | 355/18 |
| 6,496,235 B1 * | 12/2002 | Driscoll et al. | ................. | 349/58 |
| 6,870,730 B2 * | 3/2005 | Riddiford | ............... | 361/679.34 |
| 6,934,502 B2 * | 8/2005 | Okuda | ......................... | 399/379 |
| 7,068,497 B2 * | 6/2006 | Chu | ......................... | 361/679.06 |
| 7,339,782 B1 * | 3/2008 | Landes et al. | ............ | 361/679.27 |

(Continued)

FOREIGN PATENT DOCUMENTS
JP H03-117243 U 12/1991
(Continued)

*Primary Examiner* — Madelein A Nguyen
(74) *Attorney, Agent, or Firm* — Baker Botts L.L.P.

(57) ABSTRACT

An electrical apparatus includes a main body and a display device. The display device has a display panel that moves between a first and second position, and the display device, and a first and second link member. Each of the first and second link members has a first and second end. The first end of both the first and second link member is connected to the frame, and the second end of the first and second link member is connected to the main body. The first end of the first link member rotates about a first axis, and the second end rotates about a second axis. The first end of the second link member rotates about a third axis, and the second end rotates about a fourth axis. The first, second, third, and fourth axes are orthogonal to a direction in which the first and second link members extend.

18 Claims, 7 Drawing Sheets

U.S. PATENT DOCUMENTS

| | | | | |
|---|---|---|---|---|
| 7,355,843 B2* | 4/2008 | Riddiford | ............... | 361/679.27 |
| 7,411,579 B2* | 8/2008 | Tsuji et al. | ................... | 345/158 |
| 7,445,187 B2* | 11/2008 | Shin | .............................. | 248/324 |
| 7,457,108 B2* | 11/2008 | Ghosh | ...................... | 361/679.27 |
| 7,511,948 B2* | 3/2009 | Hirayama | .................... | 345/168 |
| 7,570,482 B2* | 8/2009 | Chan | ........................ | 361/679.21 |
| 7,671,841 B2* | 3/2010 | Lee et al. | ...................... | 345/158 |
| 7,764,490 B2* | 7/2010 | Muraki | ................... | 361/679.21 |
| 7,782,305 B2* | 8/2010 | Ohira et al. | ................... | 345/169 |
| 7,817,173 B2* | 10/2010 | Lewis et al. | ................... | 455/566 |
| 7,952,569 B2* | 5/2011 | Hunt et al. | ..................... | 345/179 |
| 8,042,778 B2* | 10/2011 | Wu et al. | ..................... | 248/282.1 |
| 2003/0080949 A1* | 5/2003 | Ditzik | .......................... | 345/173 |
| 2003/0117418 A1* | 6/2003 | Poynter | ........................ | 345/619 |
| 2003/0222848 A1* | 12/2003 | Solomon et al. | ............. | 345/156 |
| 2004/0021051 A1* | 2/2004 | Chiu | ............................. | 248/371 |
| 2004/0246281 A1* | 12/2004 | Vanek | .......................... | 345/905 |
| 2005/0152102 A1* | 7/2005 | Shin | ............................ | 361/681 |
| 2005/0168499 A1* | 8/2005 | Williams et al. | .............. | 345/905 |
| 2005/0190533 A1* | 9/2005 | Hultzman et al. | ............ | 361/683 |
| 2006/0055675 A1* | 3/2006 | Wilk et al. | .................... | 345/168 |
| 2006/0082958 A1* | 4/2006 | Fujiwara | ....................... | 361/681 |
| 2006/0170831 A1 | 8/2006 | Muraki et al. | | |
| 2006/0238970 A1* | 10/2006 | Ukonaho et al. | .............. | 361/683 |
| 2006/0244700 A1* | 11/2006 | Sano et al. | ....................... | 345/87 |
| 2006/0291151 A1* | 12/2006 | Chen | ............................. | 361/681 |
| 2007/0047797 A1* | 3/2007 | Vilella | .......................... | 382/141 |
| 2007/0058331 A1* | 3/2007 | Schwager et al. | ............. | 361/683 |
| 2007/0146987 A1* | 6/2007 | Sakata et al. | .................. | 361/683 |
| 2007/0258200 A1* | 11/2007 | Choi et al. | ..................... | 361/681 |
| 2008/0030936 A1* | 2/2008 | Dawson et al. | ................ | 361/681 |
| 2008/0165484 A1* | 7/2008 | Choi et al. | ..................... | 361/681 |
| 2008/0232050 A1* | 9/2008 | Muraki | ......................... | 361/681 |
| 2010/0149736 A1* | 6/2010 | Dittmer et al. | ........... | 361/679.01 |

FOREIGN PATENT DOCUMENTS

| | | |
|---|---|---|
| JP | H04-296920 A | 10/1992 |
| JP | H07-160203 A | 6/1995 |
| JP | H10-198283 A | 7/1998 |
| JP | H11-119857 A | 4/1999 |
| JP | H03-078557 U | 4/2001 |
| JP | 2001144455 A | 5/2001 |
| JP | 2004079250 A | 3/2004 |

* cited by examiner

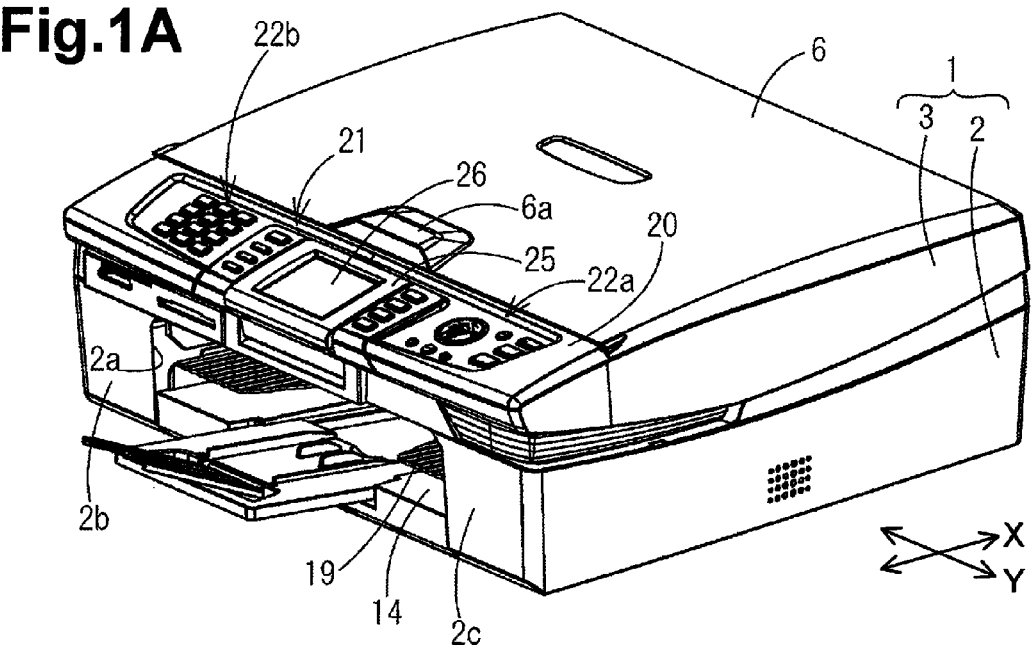
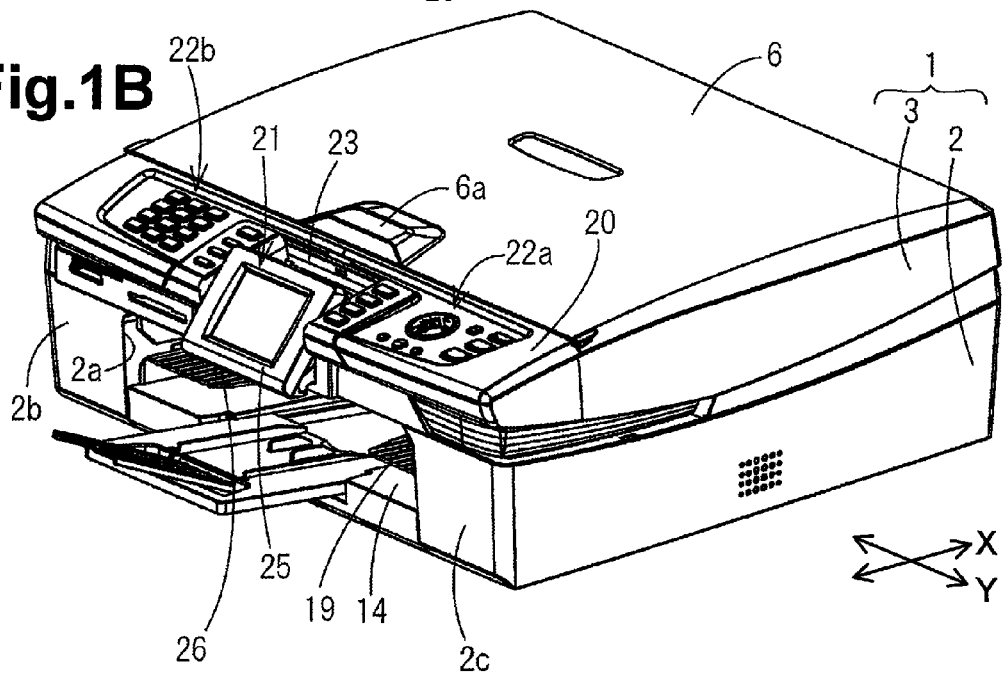

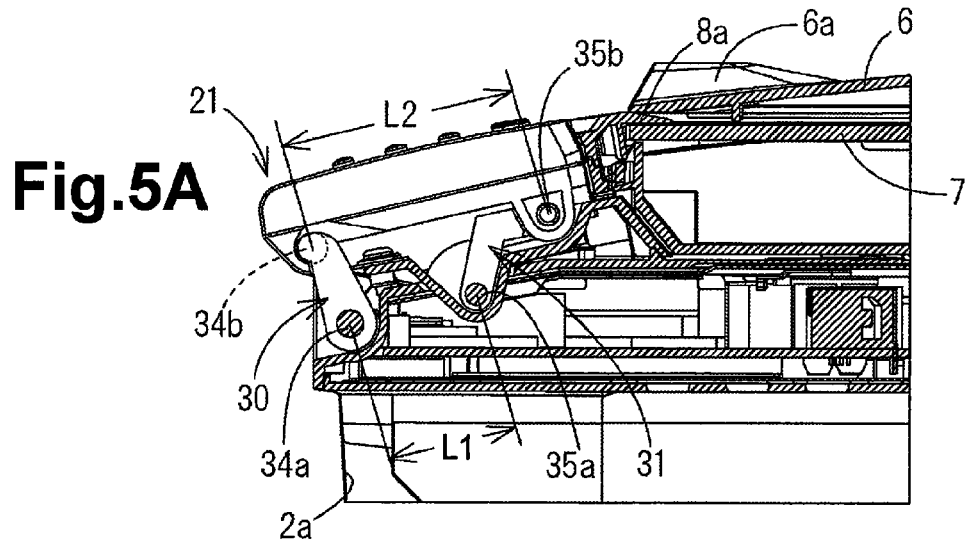
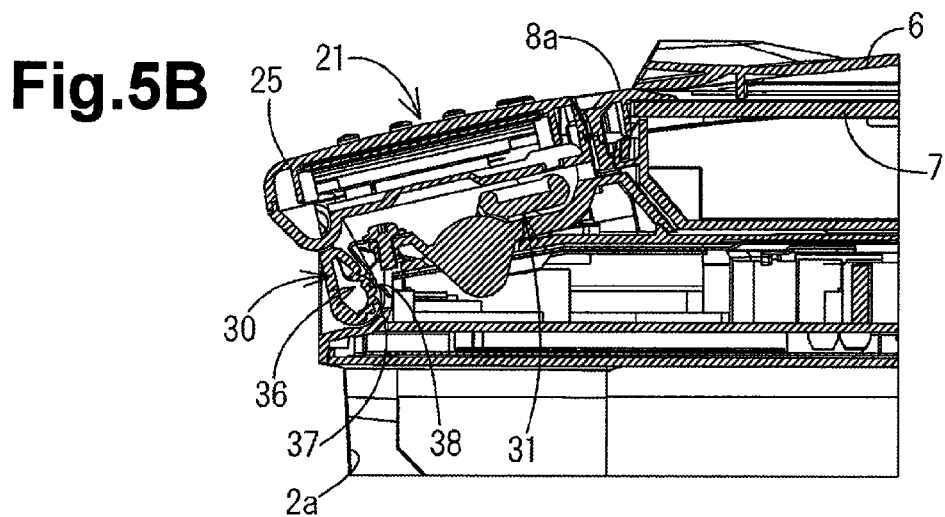
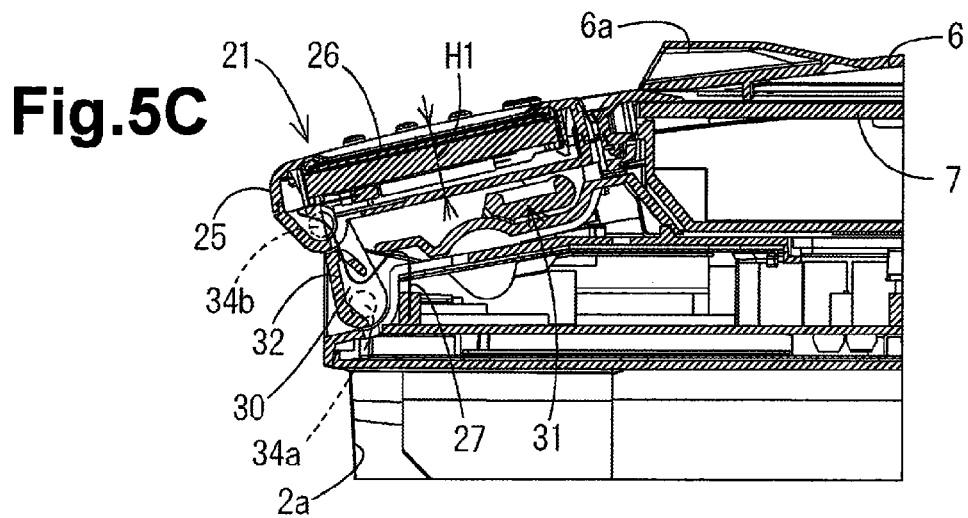

DISPLAY DEVICE AND ELECTRICAL APPARATUS HAVING SUCH DISPLAY DEVICE

CROSS REFERENCE TO RELATED APPLICATIONS

The present application claims priority to and the benefit of Japanese Patent Application No. 2007-336216, which was filed on Dec. 27, 2007, the disclosure of which is incorporated herein by reference in its entirety.

BACKGROUND OF THE INVENTION

1. Field of the Invention

The present invention relates to a display device, such as a liquid crystal display device, which may display data such as images and characters, and to an electrical apparatus, such as an image recording device, equipped with such display device.

2. Description of Related Art

A known electrical apparatus, such as a single-function device, e.g. an inkjet printer, copier, or facsimile device, or a multi-function image recording device having a printer function, copier function, scanner function, and facsimile function may be equipped with a display device. The display device may be used for controlling operation of various functions of the device and for informing the user of the current condition of the device or of operation procedures. An example of a known electrical apparatus may be described in Japanese Unexamined Patent Application Publication No. 11-119857.

In a laptop data processing device equipped with the printer disclosed in Japanese Unexamined Patent Application Publication No. 11-119857, the device has a display unit at the top of a main body, and the display unit is equipped with a low-profile touch-screen panel, such as a liquid crystal display panel. The display unit is pivotable between a lying position in which the display unit lies in a substantially horizontal state and a standing position in which the display unit is set such that the touch-screen panel faces forward. A base end of a first link member and a base end of a second link member are connected to a side face of the main body such that the first link member and the second link member are pivotable about a single pivot shaft. The first link member has a free end that is connected, via a hinge, to the display unit movably along an arc-shaped guide groove formed at a front portion of a side face of the display unit. The second link member has a guide pin on a free end thereof, and the guide pin is movably engaged in a guide groove formed in the side face of the display unit to extend in the front-rear direction.

In the known electric apparatus, the pivot shaft is provided with a lock member of a torsion coil spring type. Specifically, when a force that tries to cause the second link member to pivot rearward is smaller than or equal to a predetermined load, the lock member locks the second link member. In contrast, when the force is greater than the predetermined load, the lock member allows the second link member to pivot rearward.

However, regarding the display unit according to the known electric apparatus, the support structure for the display unit is complex and requires a large number of components. Further, when the display unit at the top of the main body pivots to a standing position, the display unit projects upward significantly at the front side of the main body, thus resulting in an increase in the height of the device. Therefore, when the display unit is in its standing position, it may become a hindrance to operations performed with respect to the main body.

SUMMARY OF THE INVENTION

Accordingly, it is an object of the present invention to provide a movable display device in which the visibility thereof may be enhanced with a minimum number of components but without causing an increase in the height of the entire device. It is another object of the present invention to provide a display device that allows for stable operation by disallowing a turning in the rear direction even when the front surface of the display device is pressed while the display device is set at a desired standing angle.

In an embodiment of the invention, a display device comprises a display panel configured to move between a first position and a second position, a frame, wherein the frame encloses the display panel, a first link member comprising a first end and a second end opposite the first end, wherein the first end of the first link member is connected to the frame and the second end of the first link member is connected to a main body of an electrical apparatus, and a second link member comprising a first end and a second end opposite the first end, wherein the first end of the second link member is connected to the frame and the second end of the second link member is connected to the main body. The first end of the first link member is configured to rotate about a first axis, and the second end of the first link member is configured to rotate about a second axis. The first end of the second link member is configured to rotate about a third axis, and the second end of the second link member is configured to rotate about a fourth axis. The first link member is configured to pivot about the second axis, and the second link member is configured to pivot about the fourth axis, and the first link member extends from the first end of the first link member to the second end of the first link member in a first direction, and the second link member extends from the first end of the second link member to the second end of the second link member in a second direction. Each of the first direction and the second direction are orthogonal to each of the first, the second, the third, and the fourth axes.

In another embodiment of the invention, an electrical apparatus comprises a main body and a display device, and the display device comprises a display panel configured to move between a first position and a second position, a frame, wherein the frame encloses the display panel, a first link member comprising a first end and a second end opposite the first end, wherein the first end of the first link member is connected to the frame and the second end of the first link member is connected to the main body, and a second link member comprising a first end and a second end opposite the first end, wherein the first end of the second link member is connected to the frame and the second end of the second link member is connected to the main body. The first end of the first link member is configured to rotate about a first axis, and the second end of the first link member is configured to rotate about a second axis. The first end of the second link member is configured to rotate about a third axis, and the second end of the second link member is configured to rotate about a fourth axis. The first link member is configured to pivot about the second axis, and the second link member is configured to pivot about the fourth axis, and the first link member extends from the first end of the first link member to the second end of the first link member in a first direction, and the second link member extends from the first end of the second link member to the second end of the second ling member in a second direction. Each of the first direction and the second direction are orthogonal to each of the first, the second, the third, and the fourth axes. The display device is disposed adjacent to an edge of an upper surface of the main body such that the first, second, third, and fourth axes extend parallel to the edge, and when the display panel is in the first position, the display panel is substantially parallel to the upper surface of the main body. When the display panel is in the second position, the display panel forms an angle with respect to the upper surface of the main body, wherein the angle formed is a maximum angle allowed by the first link member and the second link member.

BRIEF DESCRIPTION OF THE DRAWINGS

For a more complete understanding of the invention, reference now is made to the following descriptions taken in connection with the accompanying drawings.

FIG. 1A is a perspective view showing a display panel of a display device of an image recording device, in which the display panel is in a first position, according to an embodiment of the invention.

FIG. 1B is a perspective view showing a display panel of a display device of an image recording device, in which the display panel is in a second position, according to an embodiment of the invention.

FIG. 5A shows a cross-sectional view taken along line VA-VA in FIG. 2, in which the display panel is in the first position.

FIG. 5B shows a cross-sectional view taken along line VB-VB in FIG. 2, in which the display panel is in the first position.

FIG. 5C a cross-sectional view taken along line VC-VC in FIG. 2, in which the display device is in the first position.

DETAILED DESCRIPTION OF THE PREFERRED EMBODIMENTS

Figure 2:
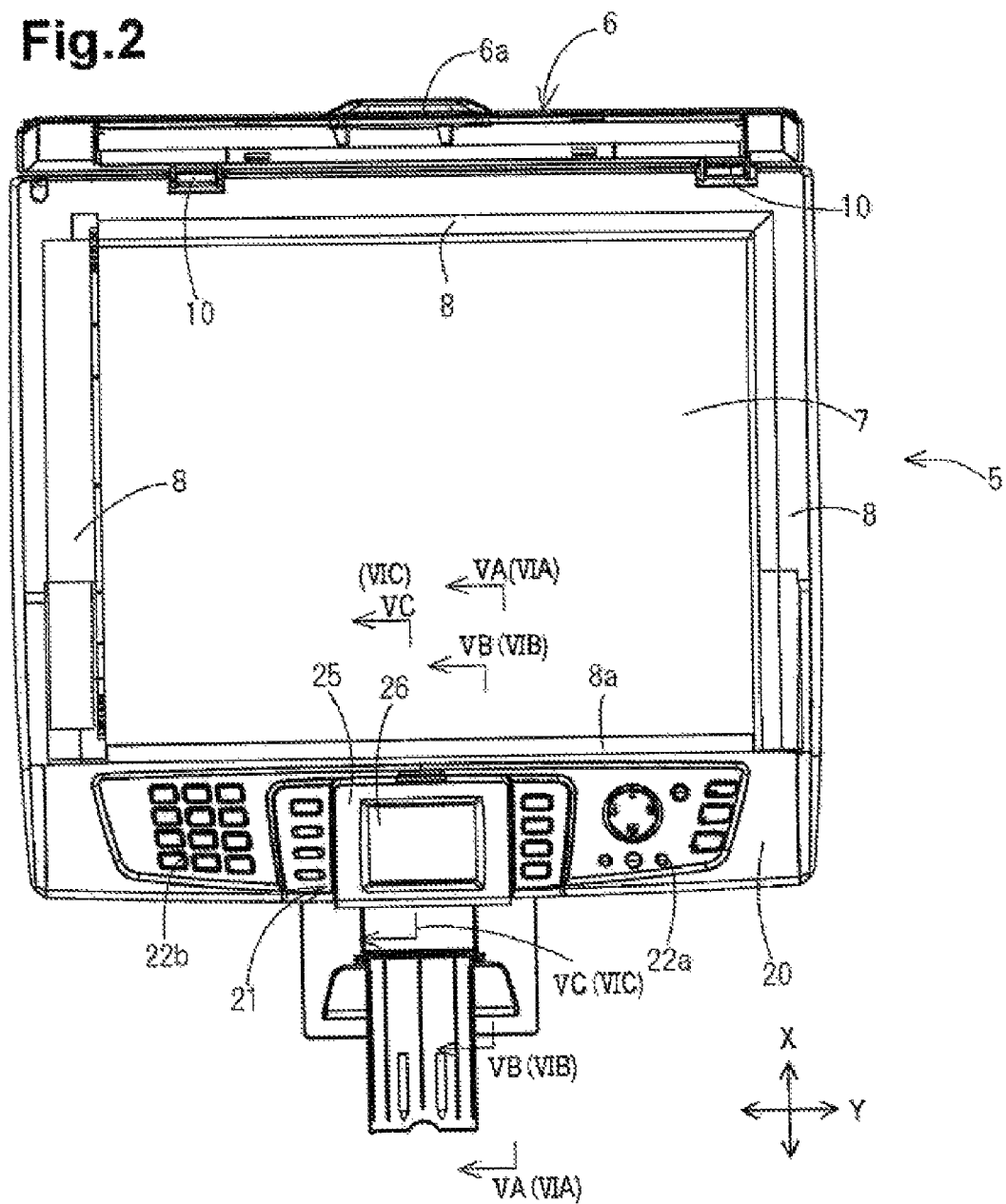
FIG. 2 is a plan view showing an image reading device in which the cover is open, according to an embodiment of the invention.

Exemplary embodiments of the present invention may be understood by referring to FIGS. 1-7, like numerals being used for like corresponding parts in the various drawings.

An embodiment of the invention will be described below with reference to FIGS. 1A to 6C. An example of an electrical apparatus, e.g., image recording device 1, according to an embodiment of the invention, may be a multi-function device ("MFD"), which may have a printer function, a copier function, a scanner function, and a facsimile function.

The image recording device 1 may comprise a lower main body 2 and an upper main body 3, each of which may be made of synthetic resin by injection molding. The upper main body 3 may be mounted on the upper surface of the lower main body 2. The upper main body 3 further may be pivotably openable and closable in the vertical direction about a pivot shaft (not shown), and may be located at the right side in FIG. 3, with respect to one side of the lower main body 2. In other words, the pivot shaft for pivotably supporting the upper main body 3, with respect to the lower main body 2, may be located on the opposite side of, e.g., the farthest side from, a frontal opening 2a of the lower main body 2. In an embodiment, the lower main body 2 and the upper main body 3 collectively may be referred to as a main body.

The upper main body 3 may be configured to accommodate an image reading device 5, which may have a copier function and a facsimile function. The image reading device 5 may comprise a glass plate 7, which may function as a document placing plate on which a document may be placed, by opening a document cover 6 upward, a frame 8 that may be configured to support four peripheral sides of the glass plate 7, and a contact image sensor ("CIS") (not shown) which may be disposed below the glass plate 7. The CIS may be reciprocable along a guide shaft (not shown) extending in a direction orthogonal to the plane of drawing in FIG. 3, e.g., the main-scanning direction, or the Y-axis direction as shown in FIGS. 1A and 1B. The rear edge of the document cover 6 may be connected to the rear edge of the upper main body 3 in a vertically pivotable fashion, about a hinge 10. The document cover 6 may move such that document cover 6 may be brought into and out of contact with the upper surface of the glass plate 7 and the frame 8. Specifically, when the document cover 6 is disposed in contact with the upper surface of the glass plate 7 and the frame 8, the document cover 6 may cover the upper surface of the upper main body 3, except for the front upper-surface portion of the upper main body 3. To open and close the document cover 6, a user may operate handle 6a located in the upper surface of the document cover 6, which may allow to allow the document cover 6 to pivot.

A front plate 2b of the lower main body 2, e.g., positioned at a side farthest from the aforementioned pivot shaft, may have a front cover 2c disposed thereon. Front cover 2c may comprise a frontal opening for an ink storage chamber (not shown). The ink storage chamber may be located inward of the front cover 2c and may have cartridges individually provided for various color inks. In an embodiment, the ink storage chamber may accommodate ink cartridges individually for black, cyan, magenta, and yellow color inks. The ink cartridges may continuously be linked to an inkjet recording head 12 in a recording unit 11 through flexible ink tubes, which will be described in further detail herein.

Figure 3:
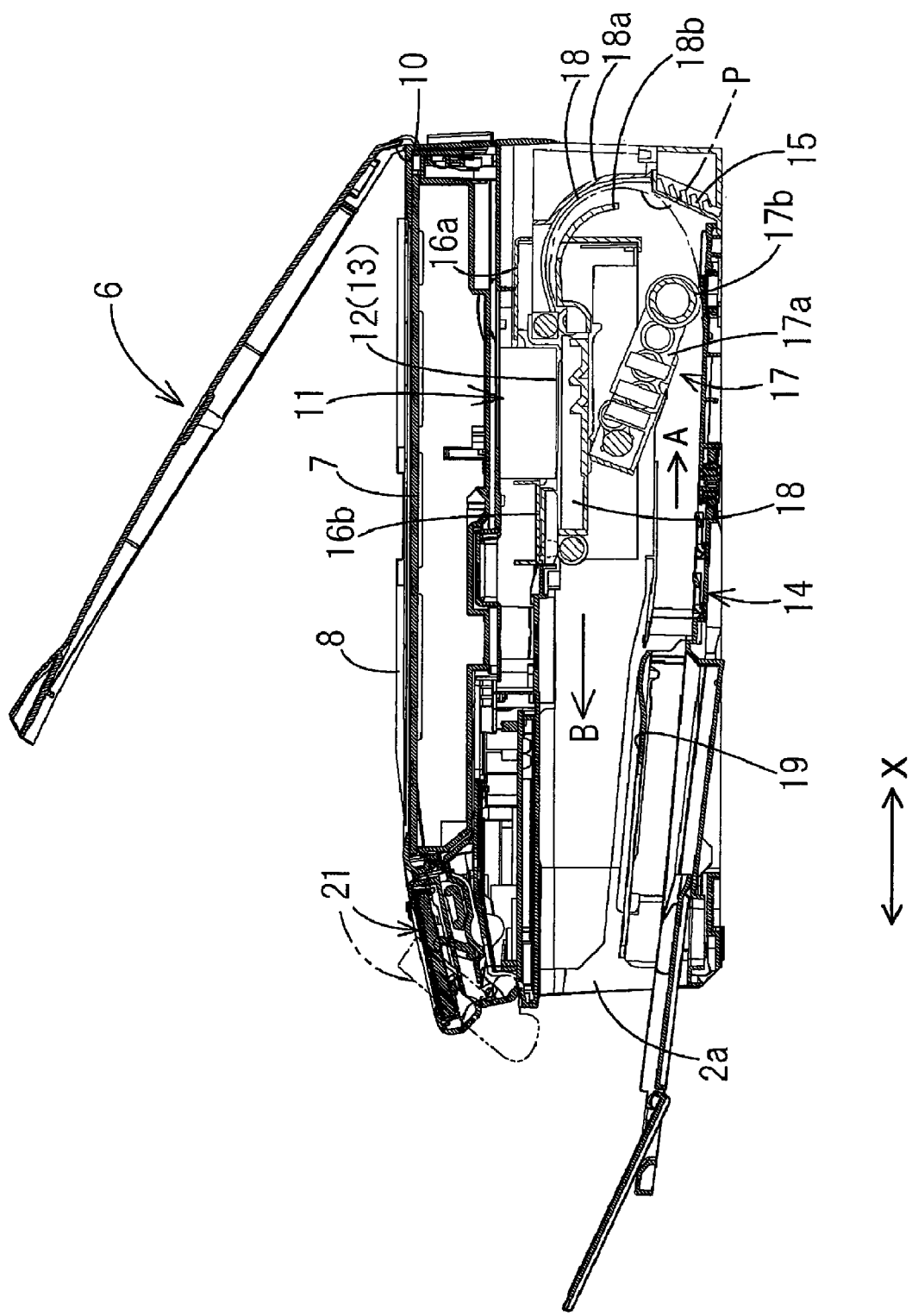
FIG. 3 is a cross-sectional view showing an image reading device in which the cover is open, according to an embodiment of the invention.

Referring to FIG. 3, a feed tray 14, which may store one or more recording media, e.g., sheets P, may be disposed at the bottom of the lower main body 2. Feed tray 14 may be disposed in lower main body 2, such that feed tray 14 may be inserted and removed. The feed tray 14 may be inserted through the frontal opening 2a of the lower main body 2. In an embodiment, the feed tray 14 may store a plurality of sheets P of recording media cut in, e.g., an A4 size, letter size, legal size, or postcard size, in a manner such that the shorter sides, e.g., the width, of the sheets P may extend in a direction to a feeding direction, e.g., a direction indicated by an arrow A.

The direction orthogonal to the feeding direction may be the main-scanning direction, e.g., the Y-axis direction.

An inclined separation plate 15 for separating the sheets P may be disposed adjacent to the inward side of the feed tray 14, e.g., the right side as shown in FIG. 3. The inclined separation plate 15 may have a substantially convex shape in plan view, such that the midsection thereof, as viewed in the width direction, e.g., a Y-axis direction, of the sheets P may be projected forward, while the inclined separation plate 15 gradually may be recessed in plan view, towards the left and right sections thereof, as viewed in the width direction of the sheets P. Moreover, the midsection of the inclined separation plate 15, as viewed in the width direction of the sheets P, may be provided with a sawtooth elastic pad (not shown) that may facilitate the separation of the sheets P by abutting against the leading edge of the sheets P.

Sheet feed mechanism 17 may comprise a base end of a feed arm 17a, which may be connected to the lower main body 2 in a vertically pivotable fashion. A feed roller 17b, which may be disposed at a free end of the feed arm 17a, may receive a rotational force from a driving source (not shown) via a gear transmission mechanism disposed within the feed arm 17a. The sheets P stacked on the feed tray 14 may be separated and conveyed one at a time, by using the feed roller 17b and the elastic pad of the inclined separation plate 15. A separated sheet P may be conveyed in the feeding direction, e.g., the direction of the arrow A, through a conveying path 18 that may include a substantially U-shaped path, such that the separated sheet P may be fed to a recording unit 11, which may be disposed at a position, e.g., a height, higher than that of the feed tray 14. The conveying path 18 may be formed in a space between a first conveying-path member 18a and a second conveying-path member 18b that respectively may constitute the outer periphery side and the inner periphery side of the U-shaped path.

The inkjet recording head 12 in the recording unit 11 may be held by a carriage 13 which may be slidably supported by a first guide member 16a, which may be disposed on the upstream side thereof, and a second guide member 16b, which may be disposed on the downstream side thereof, as viewed in a discharging direction, e.g., a direction indicated by an arrow B. This configuration may allow carriage 13 to reciprocate in the Y-axis direction. In order to make the carriage 13 movable in a reciprocable fashion, a timing belt (not shown) extending in the main-scanning direction, e.g., the Y-axis direction, may be disposed on the upper surface of the second guide member 16b. A carriage motor (not shown), which may drive the timing belt, may be fixed to the lower surface of the second guide member 16b.

After a sheet P passes between the lower surface of the recording head 12 on the carriage 13 and a flat platen 18 that may extend in the Y-axis direction while facing the lower surface of the recording head 12, the sheet P may travel between a pair of discharge rollers. The discharge rollers may be located downstream of the conveying path 18 in the discharging direction, e.g., the direction indicated by the arrow B, such that the sheet P may be discharged onto a discharge tray 19, which may be disposed above the feed tray 4. A discharge port communicating with the discharge tray 19 may be used in common with the frontal opening 2a of the lower main body 2.

An upper cover 20 may be disposed at a position adjacent to one edge, e.g., a front edge, of the upper surface of the upper main body 3, specifically, at a position forward of a front end portion 8a of the frame 8, e.g., the upper cover 20 may extend further outward than frame 8. The upper cover 20 may be made of synthetic resin by injection molding. The upper cover 20 may have a storage cavity 23 integrally formed therein, and storage cavity 23 may be open upward and forward. Operation key areas 22a and 22b may be disposed on opposite sides of the storage cavity 23. A display device 21, e.g., a liquid crystal display device, may be stored in the storage cavity 23 when the display panel 26 is facing upward. For example, as viewed from the front of the image recording device 1, the operation key area 22a on the right side may have keys for selecting and displaying desired functions to be used. The keys may include a photo capture key, a copy key, a facsimile key, a scanner key, a cross-shaped toggle key, and the like. The cross-shaped toggle key may be used for searching pre-registered facsimile numbers and for adjusting the sound volume of a telephone receiver The operation key area 22b on the left side of the display device 21, e.g., on the side of the storage cavity 23 may have a numeric keypad, e.g., for inputting facsimile numbers, a key for outputting management reports, a key for redialing facsimile numbers, and the like.

Referring to FIGS. 1A and 1B, and FIGS. 4A, and 4B, the display device 21 may comprise a casing, e.g., a frame 25 made of synthetic resin, a liquid crystal display panel 26 disposed within a frontal opening 25a of the frame 25 and capable of displaying color images, and a control substrate (not shown). A cable 27, e.g., a flexible flat cable or a harness formed of a film-coated copper wire, may have a first end connected to the control substrate and a second end connected to a main control substrate (not shown) through a through hole in the storage cavity 23. The main control substrate may be disposed in the upper main body 3 or the lower main body 2.

Figure 4A:
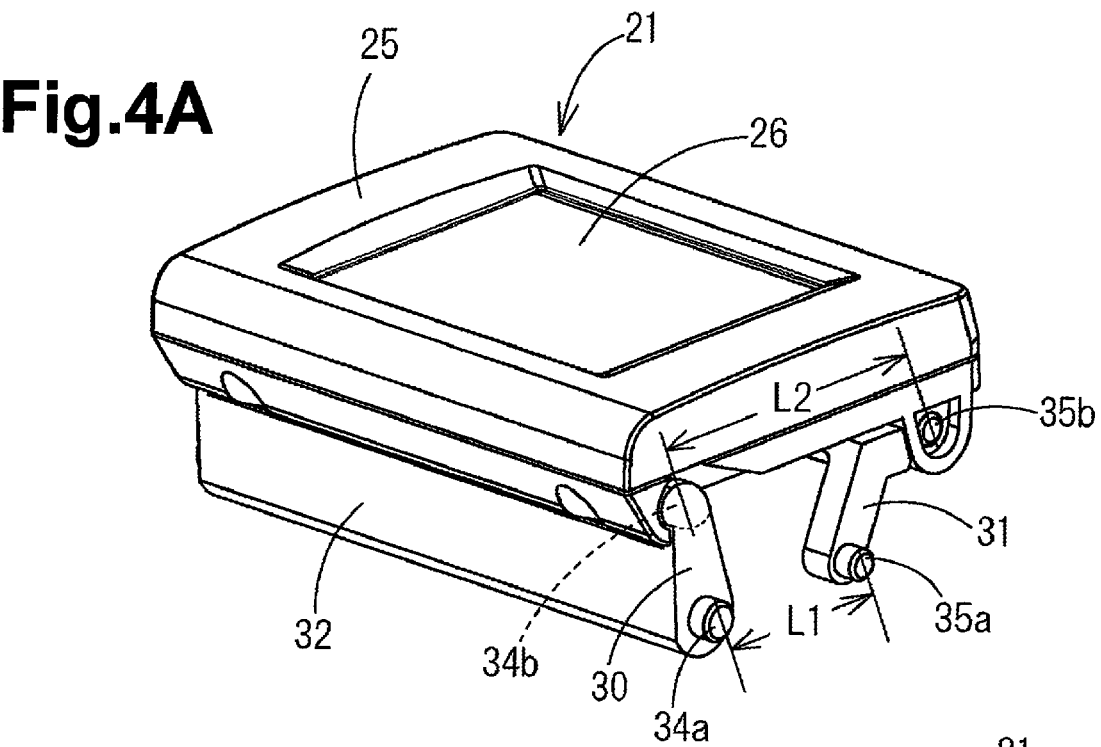
FIG. 4A is a perspective view showing the display device as viewed from the front side thereof, according to an embodiment of the invention.
Figure 4B:
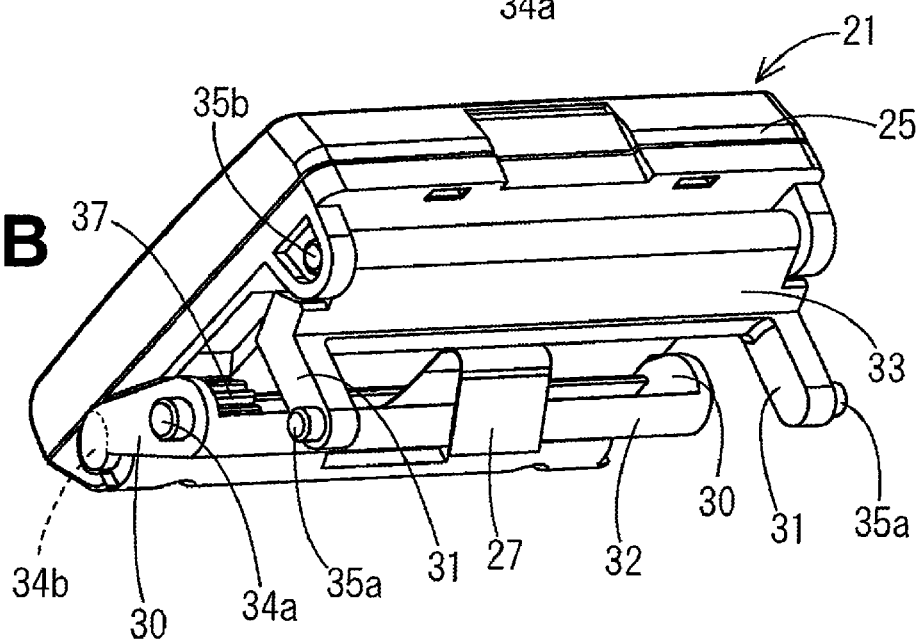
FIG. 4B is a perspective view showing the display device as viewed from the rear side thereof, according to an embodiment of the invention.

The frame 25 of the display device 21 may be connected to the storage cavity 23 formed in the upper main body 3 through first link members 30 and second link members 31. As shown in FIGS. 4A and 4B, one first link member 30 and one second link member 31 may be disposed at each of the shorter sides of the frame 25. Due to a pivoting motion of the first link members 30 and the second link members 31, the display panel 26 may be movable between a first position, e.g., a position shown in FIG. 5C, and a second position, e.g., a position shown in FIG. 6C. In the first position, the display panel 26 may lie substantially parallel to the upper surface of the main body, and in the second position, the display panel 26 may stand at a predetermined angle, e.g., a maximum angle. The display panel 26 extends further away from the main body when the display panel 26 is in the second position than when the display panel 26 is in the first position.

Figure 6A:
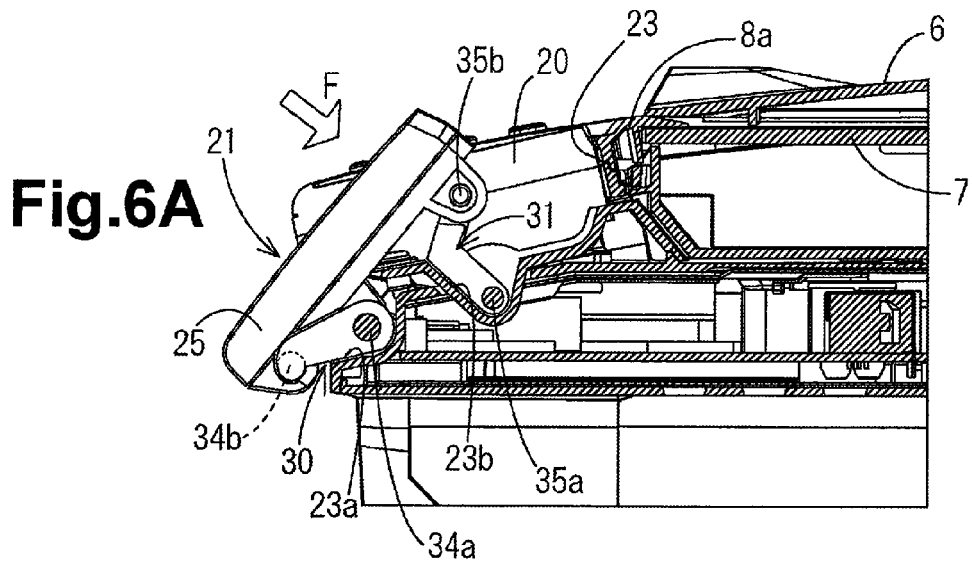
FIG. 6A shows a cross-sectional view taken along line VIA-VIA in FIG. 2, in which the display panel is in the second position.

Referring to FIGS. 5A and 6A, the first link members 30 may be substantially linear when viewed in a side view. In contrast, second link members 31 may be substantially V-shaped when viewed in a side view. At the shorter sides of the frame 25, the first link members 30 may be disposed forward of the second link members 31. The two first link members 30 may comprise respective front portions, which may be connected to a cover plate 32. Likewise, the two second link members 31 may comprise respective rear portions which may be connected to a cover plate 33. The first link members 30 and the cover plate 32 may be formed integrally using synthetic resin, and the two second link members 31 and the cover plate 33 also may be formed integrally using synthetic resin. In this configuration, when the display panel 26 is in a standing position, the rear surface of the frame 25 may be hidden by the cover plate 33, and the interior of the storage cavity 23 may be made less visible from the front, by the cover plate 32 extending between the two first link members 30. This configuration favorably may reduce the amount of space used by the display device 21. In addition, this configuration may reduce the possibility of a user's fingers getting caught between the front edge, e.g., the bottom, of the storage cavity 23 and the rear surface of the frame 25 during operation.

Referring to FIG. 5A, in a side view of the display device 21, the base end of each first link member 30 may be connected to a predetermined portion of the storage cavity 23 by a shaft 34a. Each first link member 30 may be rotatable about the shaft 34a. The opposite end of each first link member 30 may be connected to a predetermined portion of the frame 25 of the display device 21, e.g., the corresponding side surface thereof, by a shaft 34b. Each first link member 30 also may be rotatable about the shaft 34b. Similarly, the base end of each second link member 31 is connected to a predetermined portion of the storage cavity 23 by a shaft 35a, such that second link member 31 may rotate about the shaft 35a, and the opposite end of the second link member 31 is connected to a predetermined portion of the frame 25 of the display device 21, e.g., the corresponding side surface thereof, by a shaft 35b, such that the second link member 31 may rotate about the shaft 35b. Each first link member 30 may pivot about the shaft 34a, and each second link member 31 may pivot about the shaft 35a.

The shafts 34a, 34b, 35a, 35b may extend substantially parallel to one edge, e.g., a front edge of the upper surface of the upper cover 20. Each pair of first and second link members 30, 31 may be disposed in a direction orthogonal to a direction in which the shafts 34a, 34b, 35a, 35b extend, e.g., in a front-to-rear direction of the main body of the image recording device 1. Referring to FIGS. 1A and 1B, the display surface of the display panel 26, e.g., the liquid crystal display panel, may face upward from the image recording device 1 when the display panel 26 is in the first position, and may face forward when the display panel 26 is in the second position.

As shown in FIG. 5A, the shaft 34a and the shaft 35a may be separated from each other by a distance L1, and the shaft 34b and the shaft 35b may be separated from each other by a distance L2. These distances are set such that distance L2 may be greater than distance L1. This may allow the display panel 26 to move, e.g., pivot through a relatively large range when display panel 26 moves between the first position and the second position.

Referring to FIG. 6A, the first link members 30 and the second link members 31 may be disposed on and connected to the main body and the display device 21, such that an external force F, which may be applied orthogonally to the liquid crystal display panel 26 of the display device 21, may act as a moment, e.g., a moment of force, to pivot the first link members 30 and the second link members 31 in different, e.g., opposite, directions. In this state, in FIG. 6A, when an external force F is applied to press the front surface of the display panel 26 or the frame 25 of the display device 21, each first link member 30 may receive a counterclockwise moment about the shaft 34a, whereas each second link member 31 may receive a clockwise moment about the shaft 35a. Furthermore, the front surfaces of the first link member 30 and the second link member 31 respectively may abut bottom surfaces 23a and 23b of the storage cavity 23 when the display panel 26 is in the second position, e.g., the standing position. Thus, the display panel 26, namely, the frame 25, may be prevented from moving inadvertently from the standing position to the lying position in response to the external force F.

In the case where the display panel 26 is a touch-screen panel, the user may change the display screen by touching a certain position on the surface of the display panel 26, to perform a desired operation, e.g., an input operation. In that case, the inclination angle of the display panel 26 may be prevented from being changed inadvertently in response to the touching force.

The shaft 34b at the free end of the first link member 30 may be located above the shaft 34a at the base end of the first link member 30 when the display panel 26 is in the first position, and may be located below the shaft 34a when the display panel 26 is in the second position. When the display panel 26 moves from the first position to the second position, the lower end of the display device 21 may be lowered further than the upper end of the display device 21, due to a relatively larger pivot range of the first link member 30.

Figure 6B:
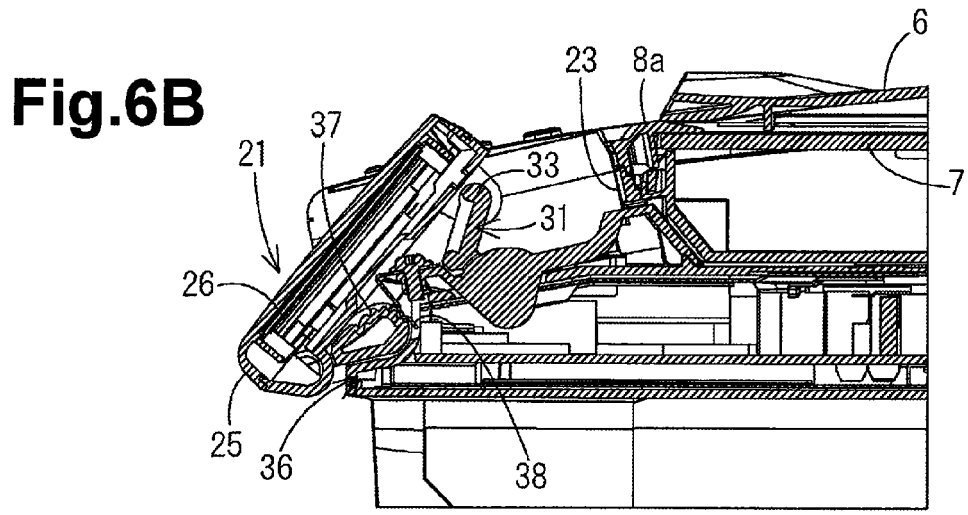
FIG. 6B shows a cross-sectional view taken along line VIB-VIB in FIG. 2, in which the display panel is in the second position.
Figure 6C:
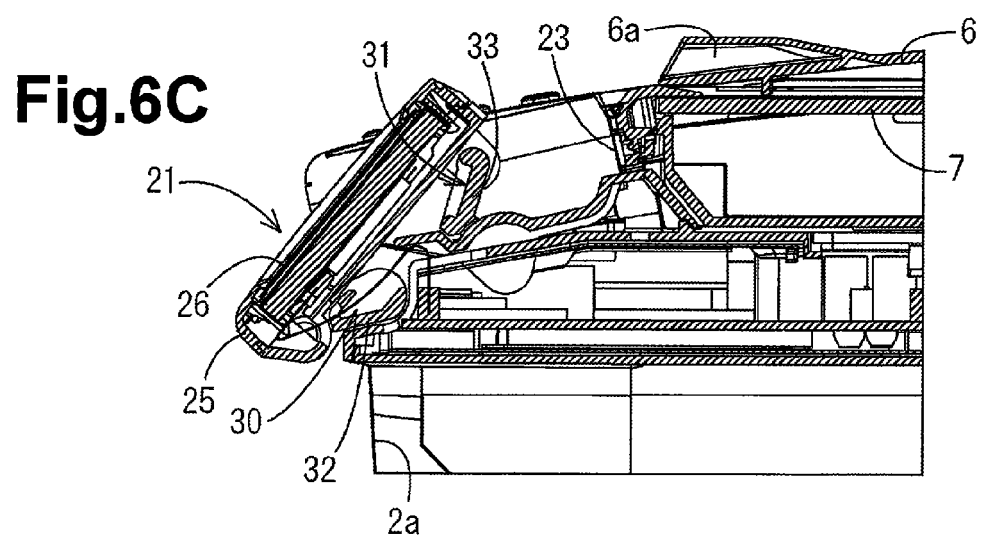
FIG. 6C shows a cross-sectional view taken along line VIC-VIC in FIG. 2, in which the display panel is in the second position.

In an embodiment, the height at the upper end of the display device 21 when the display member 26 is in the second position, e.g., the standing position, as shown in FIGS. 6A to 6C, may be set lower than a height obtained by adding a vertical thickness H1 of the frame 25 to the maximum height of the display device 21, when the display panel 26 is in the first position, e.g., the lying position, as shown in FIGS. 5A to 5C. In addition, when the display panel 26 is in the second position, the display panel 26 at least partially may project outward from an edge of the main body, e.g., the front edge, of the upper cover 20. In this manner, the display panel 26 may be positioned forward of, e.g., extending beyond the front surface of the image recording device 1. This may allow the display panel 26 to be positioned closer to the user's eyes, which may allow better readability of, display panel 26, e.g., the characters displayed on the display panel 26. Further, the upper end of the display device 21 when the display panel 26 is in the second position may be relatively distant from the front end portion 8a of the image reading device 5. This may facilitate the placing of a larger object, e.g., a book, on the upper surface of the glass plate 7, and also may facilitate turning the pages of the book.

Referring to FIGS. 4B, 5B, and 6B, at least one of the two pairs of first and second link members 30 and 31 may be provided with a latch mechanism 36 that may retain the display panel 26 at a desired angle. For example, in an embodiment of the invention, one of the first link members 30, e.g., the right first link member 30, as viewed from the front of the display device 21, may comprise a sawtooth claw 37 on an arc portion thereof, that may be disposed outward of the shaft 34a in the radial direction. On the other hand, the base end of a stopper 38 made of a metallic leaf spring may be fixed to a predetermined portion of the storage cavity 23, e.g., by a screw. The stopper 38 may be disposed such that the free end thereof may be elastically engaged to at least one of the teeth of the claw 37.

According to this configuration, the display panel 26 may be made to be positionally adjustable in a stepwise manner at appropriate inclination angles from the first position, e.g., the position shown in FIG. 1A, in which the display panel 26 may be substantially flush with the upper surface of the operation key areas 22a and 22b to the second position, e.g., the position shown in FIG. 1B, in which the display panel 26 may be positioned facing forward at an angle, e.g., about sixty degrees (60°) with respect to the horizontal plane. Accordingly, the display device 21 may click, e.g., make a noise or a mechanical pause, when the display panel 26 is in a predetermined position, which may allow the user to properly maintain the position of the display panel 26. To perform the positional adjustment, the user simply may lightly press one end of the frame 25 of the display device 21, e.g., the end closer to the free end of the document cover 6, or the end opposite thereto in a direction substantially parallel to the display panel 26, which may allow the first link members 30 and the second link members 31 to pivot.

Referring to FIGS. 6A, 6B, and 6C, when the display panel 26 is in the second position, e.g., the standing position, the lower end of the display device 21 may be set to be as high as, or higher than, the upper end of the opening 2a, for feeding and discharging the sheets P. This configuration may prevent the lower end of the display device 21 from becoming a hindrance to the sheet feeding and discharging processes. In particular, the above-described configuration advantageously may prevent a discharged sheet from contacting the lower end of the display device 21, which may reduce the possibilities of print failures, e.g., paper jams.

Because the display device 21 may be stored with its display panel 26 facing upward in the storage cavity 23 that is formed in the upper surface of the main body, the height dimension of the image recording device 1 may be reduced in its entirety.

Figure 7:
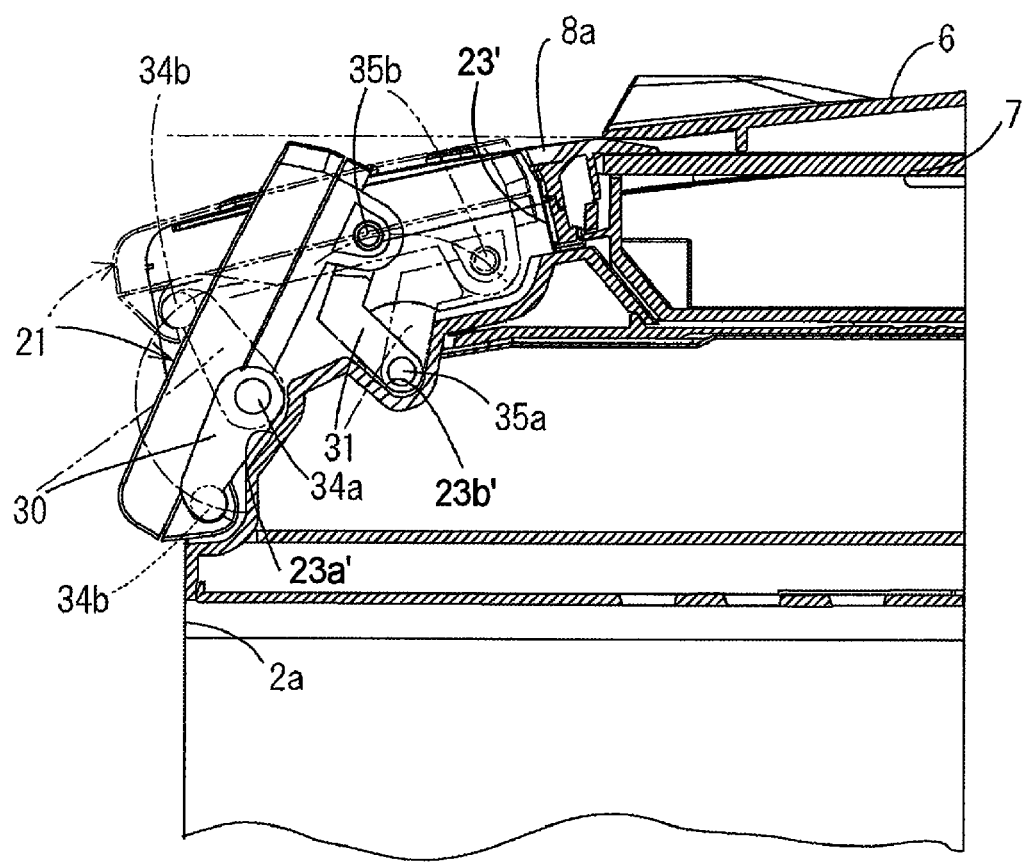
FIG. 7 shows a cross-sectional view of a display device according to another embodiment of the invention, when the display panel is in a second position.

FIG. 7 shows a display device according to another embodiment of the invention. The components in this embodiment that are the same as those in the previously described embodiment may have the same reference numerals in FIG. 7 as they have in FIGS. 1-6, and the descriptions of those components will be omitted. In this embodiment, a bottom surface 23a' of a storage cavity 23' on which the first link members 30 may abut, and a bottom surface 23b' of the storage cavity 23 on which the second link members 31 may abut, may be disposed at different positions and may have different shapes from those of the bottom surfaces 23a and 23b in the previously described embodiment. When the display panel 26 is in the second position, e.g., the standing position, the upper end of the display device 21 may be an equal height to, or lower than, the highest portion of the display device 21 when the display panel 26 is in the first position, e.g., the lying position.

In addition, the upper end of the display device 21, when the display panel 26 is in the second position, may be an equal height to, or slightly lower than, the front end portion 8a of the frame 8 that may surround the glass plate 7 serving as a document placing plate in the image reading device 5. The bottom surfaces 23a' and 23b' of the storage cavity 23, on which the front surfaces of the first link members 30 and the second link members 31 respectively abut when the display panel 26 is in the second position, may be formed at relatively lower positions when compared to the previous embodiment. The shaft 34b at the free end of the first link member 30 may be located above the shaft 34a at the base end of the first link member 30 when the display panel 26 is in the first position, and may be located below the shaft 34a when the display panel 26 is in the second position. When the display panel 26 is in the second position, the upper end of the display device 21 may be positioned relatively distant from the front end portion 8a of the frame 8 of the image reading device 5.

In this embodiment, when a large-size object, e.g., a large-sized book, is placed on the upper surface of the glass plate 7, such that images in the book may be read, and the document cover 6 may be left open, the upper end of the display device 21 when the display panel 26 is in the standing position and the edges or pages of the book may be prevented from contacting each other, thereby facilitating the process for placing the book on the upper surface of the glass plate 7 and turning the pages of the book. Furthermore, when a thick book is to be placed on the upper surface of the glass plate 7 such that the images in the book are read, it may not be necessary to move the display panel 26 from the standing position to the lying position each time a page of the book is turned.

As described above, the display panel 26, according to the previously described embodiments, may be movable between the first position, e.g., the lying position, and the second position, e.g., the standing position, which may improve the visibility of the display panel 26. Nevertheless, the height of the image recording device 1 may be prevented from increasing when the display panel 26 moves from the first position to the second position. In addition, stable operation of the display panel 26, which may be a touch-sensitive panel, may be improved, because the display panel 26 may be prevented from moving inadvertently when pressed orthogonally to the display panel 26.

In the previously-described embodiments, the display device 21 may be positioned adjacent to the front edge of the upper surface of the image recording device 1, and the shafts 34a, 35a, which may define pivot axes of the first link member 30 and the second link member 31, respectively, may extend substantially parallel to the front edge. Nevertheless, in other embodiments, the position of the display device 21 and the orientation of the pivot axes with respect to the image recording device 1 may be modified.

In the previously mentioned embodiments, a pair of first and second link members 30, 31 may be disposed at each of the opposite sides of the display device 21. Nevertheless, in another embodiment of the invention, a single first link member and a single second link member may be disposed at the midsection of the display device 21 as viewed in the longitudinal direction thereof. In yet another embodiment of the invention, two first link members and one second link member may be disposed at three triangular positions of the display device.

In the previously mentioned embodiments, the display device 21 may be applied to an electrical apparatus defined by a multi-function image recording device equipped with an image reading device on the upper surface thereof, Nevertheless, the display device 21 could alternatively be applied to an any other electrical apparatus, e.g., an electrical apparatus defined by, e.g., a single-function image recording device, such as a printer, copier, or facsimile device.

While the invention has been described in connection with preferred embodiments, it will be understood by those of ordinary skill in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples only are considered as exemplary of the invention, with the true scope of the invention being defined by the following claims.

What is claimed is:

1. A display device comprising:
   a display panel configured to move between a first position and a second position;
   a frame, wherein the frame encloses the display panel;
   a first link member comprising a first end and a second end opposite the first end, wherein the first end of the first link member is connected to the frame at a first axis and the second end of the first link member is connected to a main body of an electrical apparatus at a second axis; and
   a second link member comprising a first end and a second end opposite the first end, wherein the first end of the second link member is connected to the frame at a third axis and the second end of the second link member is connected to the main body at a fourth axis,
   wherein the first end of the first link member is configured to rotate about the first axis, and the second end of the first link member is configured to rotate about the second axis, wherein the first end of the second link member is configured to rotate about the third axis, and the second end of the second link member is configured to rotate about the fourth axis, wherein the first link member is configured to pivot about the second axis, and the second link member is configured to pivot about the fourth axis, and the first link member extends from the first end of the first link member to the second end of the first link member in a first direction, and the second link member extends from the first end of the second link member to the second end of the second link member in a second direction, wherein each of the first direction and the second direction are orthogonal to each of the first, the second, the third, and the fourth axes, wherein a distance between the first and third axes is greater than a distance between the second and fourth axes.

2. The display device according to claim 1, wherein the display panel extends further away from the main body when the display panel is in the second position than when the display panel is in the first position.

3. The display device according to claim 1, wherein when the display panel is in the first position, the first axis is located above the second axis, and when the display panel is in the second position, the first axis is located below the second axis.

4. The display device according to claim 1, wherein when the display panel is in the second position, an upper end of the display device is disposed at a same height as or lower than a height of the entire display device when the display panel is in the first position.

5. The display device according to claim 1, wherein the first link member is configured to pivot about the second axis in a first direction in response to an external force applied orthogonally to the display panel, and the second link member is configured to pivot about the fourth axis in a second direction opposite to the first direction in response to an external force applied orthogonally to the display panel.

6. The display device according to claim 1, wherein at least one of the first link member and the second link member comprises a latch mechanism configured to hold the display panel at a predetermined angle with respect to the main body.

7. An electrical apparatus comprising:
   a main body; and
   a display device, wherein the display device comprises:
      a display panel configured to move between a first position and a second position;
      a frame, wherein the frame encloses the display panel;
      a first link member comprising a first end and a second end opposite the first end, wherein the first end of the first link member is connected to the frame and the second end of the first link member is connected to the main body; and
      a second link member comprising a first end and a second end opposite the first end, wherein the first end of the second link member is connected to the frame and the second end of the second link member is connected to the main body,
   wherein the first end of the first link member is configured to rotate about a first axis, and the second end of the first link member is configured to rotate about a second axis, wherein the first end of the second link member is configured to rotate about a third axis, and the second end of the second link member is configured to rotate about a fourth axis, wherein the first link member is configured to pivot about the second axis, and the second link member is configured to pivot about the fourth axis, and the first link member extends from the first end of the first link member to the second end of the first link member in a first direction, and the second link member extends from the first end of the second link member to the second end of the second link member in a second direction, wherein each of the first direction and the second direction are orthogonal to each of the first, the second, the third, and the fourth axes, and wherein the display device is disposed adjacent to an edge of an upper surface of the main body such that the first, second, third, and fourth axes extend in a direction parallel to the edge of the upper surface, wherein when the display panel is in the second position, the display panel forms an angle with respect to the upper surface of the main body, wherein the angle formed is a maximum angle allowed by the first link member and the second link member, and wherein a distance between the first and third axes is greater than a distance between the second and fourth axes.

8. The electrical apparatus according to claim 7, wherein when the display panel is in the second position, at least a portion of the display panel extends further outward than the edge of the main body.

9. The electrical apparatus according to claim 7, wherein the display device is disposed adjacent to a front edge of the upper surface of the main body.

10. The electrical apparatus according to claim 9, wherein when the display panel is in the first position, the display panel faces upward, and when the display panel is in the second position, the display panel faces forward, relative to the main body.

11. The electrical apparatus according to claim 10, wherein the first link member is disposed closer to a front end of the main body than the second link member.

12. The electrical apparatus according to claim 7, wherein the first link member and the second link member are positioned along a line that extends from a front end of the main body to a rear end of the main body, and the first link member is positioned closer to the front end of the main body than the second link member.

13. The electrical apparatus according to claim 7, wherein the upper surface of the main body comprises a cavity formed therein, and the cavity is configured to open upward and configured, when the display panel is facing upward, to store the display device therein.

14. The electrical apparatus according to claim 13, wherein the second end of the first link member is connected to a first portion of the cavity, and the second end of the second link member is connected to a second portion of the cavity.

15. The electrical apparatus according to claim 14, wherein a bottom portion of the cavity comprises at least one contact surface adjacent to at least one of the first link member and the second link member, when the display panel is in the second position.

16. The electrical apparatus according to claim 7, further comprising:
   at least one operation key; and
   an image reading device comprising a document placing plate and a plate frame surrounding the document placing plate;
   wherein the at least one operation key and the display device are disposed on a front side of the upper surface of the main body, and the image reading device is disposed behind the at least one operation key and the display device, and when the display panel is in the second position, an upper end of the display device is disposed at a same height as or lower than a front end portion of the plate frame.

17. The electrical apparatus according to claim 16, wherein when the display device is in the second position, the upper end of the display panel and the front end portion of the plate frame are separated by a predetermined distance.

18. The electrical apparatus according to claim 16, further comprising:
   a recording unit configured to form an image and disposed inside the main body; and
   a feeding and discharging portion disposed inside the main body, and configured to feed a recording medium to the recording unit and to discharge the recording medium from the recording unit;
wherein a front of the main body has an opening formed therethrough, and the opening is configured to communicate with the feeding and discharging portion, wherein when the display panel is in the second position, a lower end of the display device is disposed at a same height as or higher than an upper end of the opening.

* * * * *